US007236503B2

(12) United States Patent
Sexton et al.

(10) Patent No.: US 7,236,503 B2
(45) Date of Patent: Jun. 26, 2007

(54) SHORT RANGE RF COMMUNICATION FOR JET ENGINE CONTROL

(75) Inventors: Daniel White Sexton, Niskayuna, NY (US); John Erik Hershey, Ballston Lake, NY (US)

(73) Assignee: General Electric Company, Niskayuna, NY (US)

( * ) Notice: Subject to any disclaimer, the term of this patent is extended or adjusted under 35 U.S.C. 154(b) by 960 days.

(21) Appl. No.: 10/082,382

(22) Filed: Feb. 26, 2002

(65) Prior Publication Data

US 2003/0161273 A1    Aug. 28, 2003

(51) Int. Cl.
*H04J 3/12*    (2006.01)
(52) U.S. Cl. .................. 370/527; 370/528; 370/529
(58) Field of Classification Search ............. None
See application file for complete search history.

(56) References Cited

U.S. PATENT DOCUMENTS

| | | |
|---|---|---|
| 4,704,736 A | 11/1987 | Kasser |
| 4,856,084 A | 8/1989 | Richards, Jr. |
| 4,965,854 A | 10/1990 | Glazebrook |
| 5,170,489 A | 12/1992 | Glazebrook |
| 5,379,445 A | 1/1995 | Arnstein et al. |
| 5,574,979 A | 11/1996 | West |
| 5,656,966 A | 8/1997 | Wilmot et al. |
| 5,852,381 A | 12/1998 | Wilmot et al. |
| 5,889,821 A | 3/1999 | Arnstein et al. |
| 6,148,179 A | 11/2000 | Wright et al. |
| 6,160,998 A | 12/2000 | Wright et al. |
| 6,163,681 A | 12/2000 | Wright et al. |
| 6,167,238 A | 12/2000 | Wright |
| 6,167,239 A | 12/2000 | Wright et al. |
| 6,173,159 B1 | 1/2001 | Wright et al. |
| 6,611,231 B2 * | 8/2003 | Crilly et al. ............... 342/378 |
| 6,785,513 B1 * | 8/2004 | Sivaprakasam ............ 455/63.1 |
| 2002/0051498 A1 * | 5/2002 | Thomas et al. ............ 375/262 |
| 2005/0135295 A1 * | 6/2005 | Walton et al. .............. 370/328 |

OTHER PUBLICATIONS

J. C. Haartsen, "The Bluetooth Radio System," IEEE Communications Society, XP000908653, vol. 7, No. 1, Feb. 2000, ISSN: 1070-9916; pp. 28-36.

* cited by examiner

*Primary Examiner*—Chirag G. Shah
*Assistant Examiner*—Thien D. Tran
(74) *Attorney, Agent, or Firm*—Richard A. DeCristofaro; Patrick K. Patnode (57) ABSTRACT

A method transmitting a message over at least one of a plurality of radio frequency (RF) channels of an RF communications network is provided. The method comprises the steps of detecting a presence of jamming pulses in the at least one of the plurality of RF channels. The characteristics of the jamming pulses in the at least one of the plurality of RF channels is determined wherein the determined characteristics define at least interstices between the jamming pulses. The message is transmitted over the at least one of the plurality of RF channels wherein the message is transmitted within the interstices of the jamming pulse determined from the step of determining characteristics of the jamming pulses.

21 Claims, 9 Drawing Sheets

SHORT RANGE RF COMMUNICATION FOR JET ENGINE CONTROL

STATEMENT REGARDING FEDERALLY SPONSORED RESEARCH & DEVELOPMENT

The U.S. Government may have certain rights in this invention pursuant to the National Aeronautics and Space Administration (NASA) contract Number NAS3-27720 awarded by NASA.

BACKGROUND OF THE INVENTION

The present invention relates to radio frequency (RF) communication over a short distance, and more particularly, to the transmission of short range RF communication signals in the presence of constant and intermittent interferers having strong power relative to the communication signal power.

As modern commercial aircraft engines have become increasingly complex, it has become practice to develop and deploy automatic control of various functions in order to prevent stressing of the aircraft crew. One of the signal developments in this discipline has been the Full Authority Digital Engine Control (FADEC). Previously, commercial FADEC technology became operational on large passenger jet aircraft. The FADEC is an aircraft control that performs comprehensive monitoring of vital engine parameters and concomitant adjustment of engine control variables. The control loop realized with the FADEC results in significantly reduced fuel consumption and thereby increased engine efficiency and lower aircraft operating costs. It also promotes greater overall engine reliability.

As aircraft engines have become larger and more complex, it has become desirable to decentralize the FADEC functions. One approach to decentralizing the FADEC functions is to realize the FADEC as a distributed control system composed of two component classes. The first component class constitutes the Remote Digital Electronic Controllers (RDEC). The RDEC are under supervision by the second component class that constitutes the Central Digital Electronic Controller (CDEC). Typically, the controllers, RDEC and/or CDEC, include various sensors.

In a distributed realization of the FADEC, reliable communication between the CDEC and the RDEC is needed. Typically, communication between the CDEC and RDEC uses hardwired cables. This approach is costly and adds significant maintenance overhead if applied to a decentralized FADEC configuration. One approach that has been suggested is to use an extant short range RF communication system. Many RF communication techniques can be used, such as, for example, Bluetooth. Typically, Bluetooth comprises a system approach that was developed with the aim of eliminating cabling between certain electronic modules. Further, Bluetooth is an evolving standard and specification that is supported by a consortium of electronics manufacturers that seek to promote short range wireless communication between mobile electronic devices. Another communication technique is the IEEE standard 802.11. Typically, the IEEE standard 802.11 is used for wireless local area networking and specifies a communications protocol known as carrier sense multiple access/collision avoidance (CSMA/CA). Both the Bluetooth and the IEEE standard 802.11 techniques are designed to operate in fixed and controlled frequency bands that can have the frequencies of operation vary according to geographic region.

However, extant short range RF communications techniques, such as, Bluetooth, IEEE standard 802.11, and other standard or proto-standard techniques are not entirely suitable for use in a decentralized FADEC because of significant electromagnetic interference (EMI) that exists in the operating environment of the CDEC and RDEC. The EMI that exists in the operating environment is caused by various sources, such as, for example, radar and strong communication signals. The strong communication signals interference can be considered as approximately continuous in time and of long persistence. However, the radar interference is different in its interference characteristics. Typically, radar interference characteristics have two types. The first type is so-called square wave pulsed radar that typically exhibits a pulse repetition frequency (PRF) of about 300 to about 1000 pulses per second (PPS) with pulse widths of from about 1 to about 3 microseconds. The second type is so-called pulsed radar that typically exhibits a PRF of about 1000 to about 3000 PPS with pulse widths of about 0.25 to about 1.5 microseconds. In addition, the EMI interference can exist on many different frequencies.

The EMI in the communications environment can cause problems with the communication system because of the persistence and duration of the EMI. In addition, the received interference signal power and interference signal spectral content also can cause problems with the communication system. Further, the uncertainty of the EMI interference is also a factor that can cause problems with the communication system. Specifically, strong communication signals may exhibit extended persistence but have a spectral composition of limited width when compared to a radar interfering signal composed of periodic pulses of relatively low duty cycle. However, the limited duration of the radar interference pulses imparts a wide spectral content to the interfering radar signal, and the shorter the pulse duration of the pulse then the wider the interfering spectrum.

Yet another consideration to be considered when adopting a short range RF communications system is the impact the communication system, itself, has on other users. In a first consideration, the Federal Communications Commission (FCC) has promulgated regulations respecting the transmission of radio signals and these regulations must be observed. In a second consideration, the short range RF communications can constitute EMI to control and other electronics within the host aircraft. As a consequence of these considerations, it would be necessary to carefully design RF signaling used for short range communications supporting the FADEC functions.

Finally, another consideration relates to the timeliness of data transport. A common approach to reliable communication over an intermittently highly disturbed RF link is to use a data transport protocol that relies on acknowledgment/non-acknowledgment. Such a technique is typically not used because some of the data to be communicated within the decentralized FADEC does not tolerate the increased latency that may occur using this conventional technique.

Therefore a desire exists to provide operationally reliable RF communications link between a CDEC and RDEC of a decentralized FADEC that is compliant with regulations and compatible with ancillary electronics.

BRIEF SUMMARY OF THE INVENTION

In one exemplary embodiment a method for communicating a message over a radio frequency (RF) communications network having a plurality of RF channels is provided. The method comprises the steps of partitioning the message into a plurality of blocks having a predetermined order. The plurality of blocks is converted into a plurality of packets. A subset of the plurality of packets is selected. The selected subset of the plurality of packets is transmitted over at least one of the plurality of RF channels of the RF communications network. The selected subset of the plurality of packets transmitted over the at least one of the plurality of RF channels is received. A quality of the at least one of the plurality of RF channels is estimated from at least the received selected subset of the plurality of packets. An estimate of the message is constructed using at least the received selected subset of the plurality of packets and the estimated quality of the at least one of the plurality of RF channels.

In another exemplary embodiment, a method transmitting a message over at least one of a plurality of radio frequency (RF) channels of an RF communications network is provided. The method comprises the steps of detecting a presence of jamming pulses in the at least one of the plurality of RF channels. The characteristics of the jamming pulses in the at least one of the plurality of RF channels is determined wherein the determined characteristics define at least interstices between the jamming pulses. The message is transmitted over the at least one of the plurality of RF channels wherein the message is transmitted within the interstices of the jamming pulse determined from the step of determining characteristics of the jamming pulses.

DETAILED DESCRIPTION OF THE INVENTION

Figure 1:
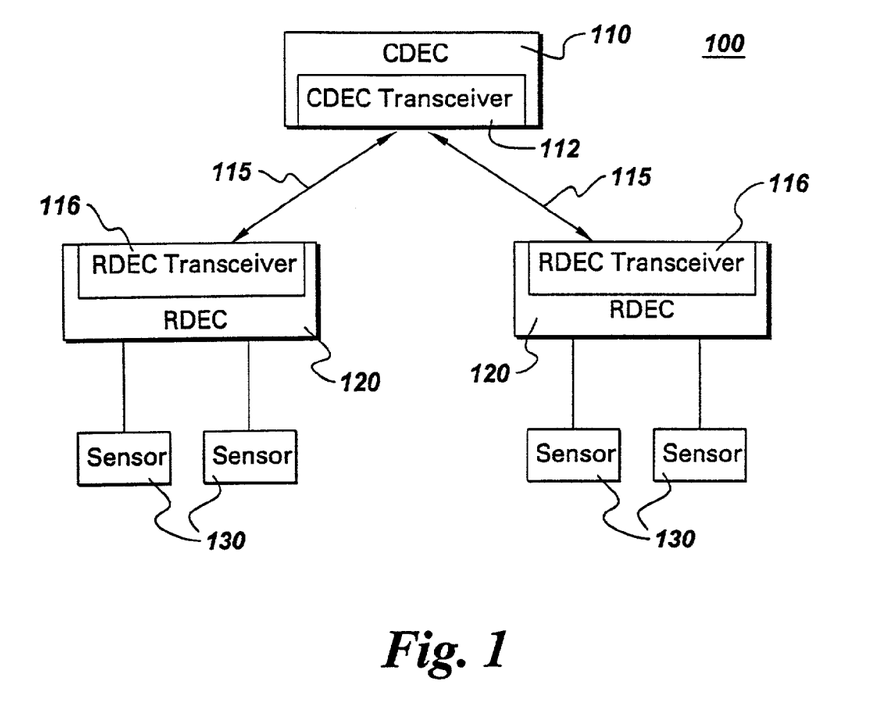
FIG. 1 is a block diagram of one representative embodiment of a decentralized control loop using short range RF communications.

In FIG. 1, a decentralized full authority digital engine control (FADEC) 100 comprises a central digital electronic controller (CDEC) 110 connected to at least one remote digital electronic controller (RDEC) 120 via at least one radio frequency (RF) link 115. In one embodiment, the RF link 115 is bi-directional, and in another embodiment, the RF link 115 is unidirectional. The CDEC 110 and the RDEC 120 are located within an operational unit and can be positioned a predetermined distance apart. In one embodiment, the operational unit comprises a transportation device or vehicle, such as, for example, an aircraft. The CDEC 110 and the RDEC 120 communicate information using the RF link 115 to monitor the operational condition and control the operational variables and/or characteristics of the operational unit. In one embodiment, the RF link 115 uses Bluetooth communications techniques. In another embodiment, the RF link 115 uses IEEE standard 802.11 communications techniques. In even another embodiment, the RF link uses other standard or proto-standard communications techniques.

As further shown in FIG. 1, the CDEC 110 includes a CDEC transceiver 112 that is used to communicate over the RF link 115. In one embodiment, the CDEC transceiver 112 comprises a transmitter for transmitting information via the RF link 115. In another embodiment, the CDEC transceiver 112 comprises a receiver for receiving information that has been transmitted via the RF link 115. In even another embodiment, the CDEC transceiver 112 comprises both a transmitter and a receiver for transmitting and receiving information via the RF link 115. Also as shown FIG. 1, the RDEC 120 includes a RDEC transceiver 116 for communicating with the CDEC via the RF link 115. In one embodiment, the RDEC transceiver 116 comprises a transmitter for transmitting information via the RF link 115. In another embodiment, the RDEC transceiver 116 comprises a receiver for receiving information that has been transmitted via the RF link 115. In even another embodiment, the RDEC transceiver 116 comprises both a transmitter and a receiver for transmitting and receiving information via the RF link 115. As further shown in FIG. 1, in one embodiment, the CDEC 110 can be connected via the RF link 115 to a plurality of RDECs 120. Further, each RDEC 120 is connected to at least one sensor 130 to constantly or periodically monitor the operational variables of the operational unit and/or the conditions of the operational environment in the operational unit. It should be appreciated that the information and/or data obtained from the sensors 130 are communicated by the RDEC 120 to the CDEC 110 via the RF link 115 to control the operational variables and/or characteristics of the operational unit. In addition, in one embodiment, the CDEC transceiver 112 and the RDEC transceiver 116 comprise an orthogonal frequency division multiplexing (OFDM) and wide band transmitter unit.

Figure 2:
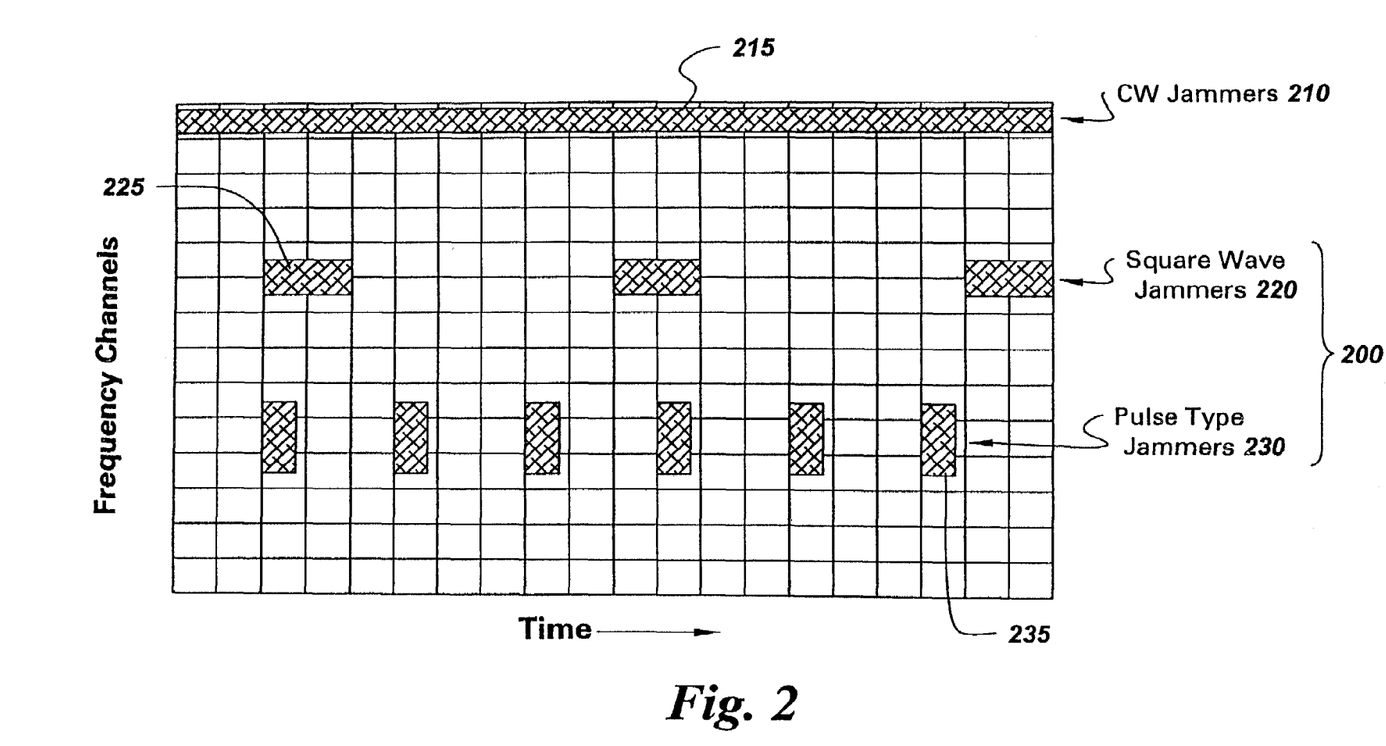
FIG. 2 is a frequency channel versus time plot of representative interferers that may be present in an electromagnetic environment.

Typically, the RF link 115 connecting the CDEC 110 and the RDEC unit 120 is subject to constant and intermittent interference including, for example, electromagnetic interference (EMI). In one embodiment, the interference can comprise signals having a power level that is higher than the power levels used for signaling and/or communication of data or information via the RF link 115. As shown in FIG. 2, one embodiment of the interference that can exist in the operating environment of the CDEC 110 and the RDEC 120 is provided in a plot showing the time and frequency behavior of the interference. In one embodiment, the interference comprises continuous wave (CW) jammers 210, square wave jammers 220 and pulse type jammers 230. The square wave jammers 220 and the pulse type jammers 230 comprise radar interference 200. It should be appreciated that each of continuous wave (CW) jammers 210, square wave jammers 220 and pulse type jammers 230 can also be termed interferers. The continuous wave (CW) jammers 210 typically exhibit a signal having a relatively long duration time and having a limited bandwidth 215. Both the square wave jammers 220 and the pulse type jammers 230 comprise a plurality of repetitive pulses 225 and 235, respectively. In comparing both types of radar interference 200, the square wave jammers 220 exhibit pulses 225 having a relatively long duration but smaller bandwidth than the pulse type jammers 230 that have pulses 235 that are, in comparison, shorter in duration but larger in bandwidth.

Figure 3:
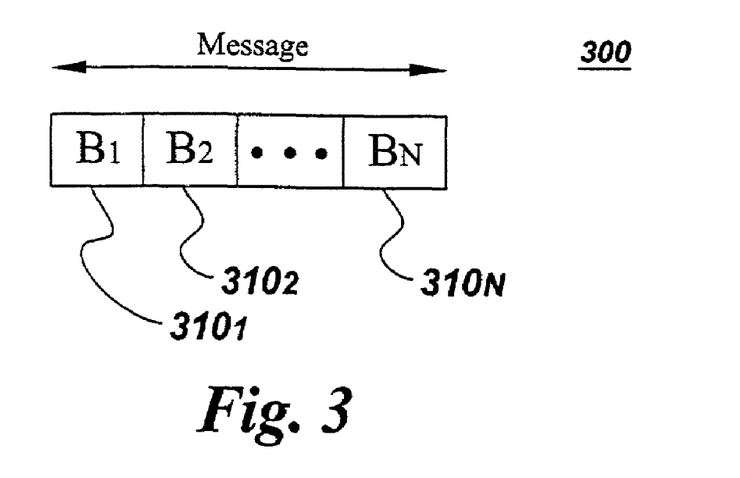
FIG. 3 is a block diagram of one representative embodiment of a digital message that is partitioned in a plurality of blocks.
Figure 4:
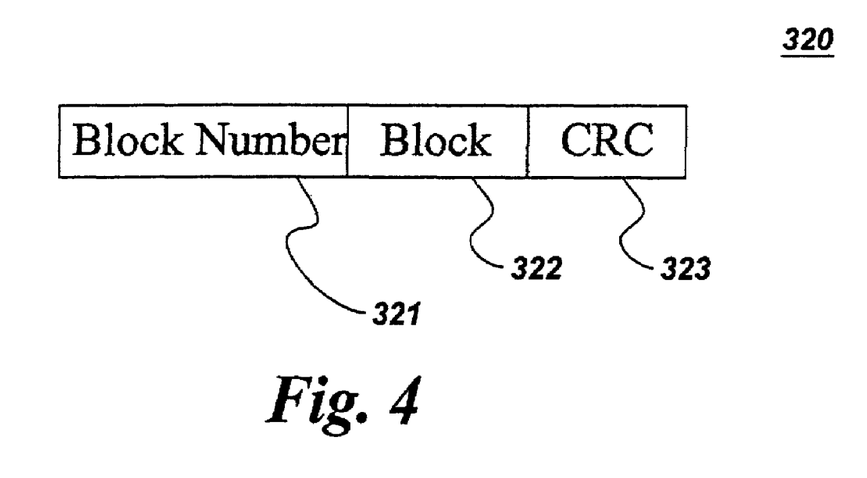
FIG. 4 is a block diagram of one representative embodiment of a packet contained in a block of a digital message.

As shown in FIG. 3, one embodiment of a digital message 300 that can be sent between the CDEC 110 and the RDEC 120 via the RF link 115 is provided. As described hereinafter, the transmission over the RF link 115 is described as being transmitted from the CDEC transceiver 112 to the RDEC transceiver 116. However, it should be appreciated that the transmission can also take place from the RDEC transceiver 116 to the CDEC transceiver 112 via the RF link 115 and, therefore, either unit could perform the tasks as described herein. The digital message 300 is partitioned into N blocks $310_1, 310_2, \ldots 310_N$ by the CDEC transceiver 112. In one embodiment, the digital messages 300 are generated at a constant rate of "R" per second by the CDEC transceiver 112. In one embodiment, as shown in FIG. 4, the N blocks $310_1, 310_2, \ldots 310_N$ are prepared for transmission by the CDEC transceiver 112 wherein each block $310_1, 310_2, \ldots 310_N$ of equal length is converted into a packet 320. In this embodiment, the packet 320 includes a block number field 321, a block field 322 and an error control field 323. The block number field 321 contains the block number of the block $310_1, 310_2, \ldots 310_N$. The block field 322 contains the information and/or data contained in the block $310_1, 310_2, \ldots 310_N$. The error control field 323 contains information to control and/or identify errors caused during transmission. In one embodiment, the error control field 323 contains a cyclic redundancy code (CRC) computed over the block number field 321 and the block field 322. Once the blocks $310_1, 310_2, \ldots 310_N$ are converted, the packets 320 are transmitted by the CDEC transceiver 112 to the RDEC transceiver 116 via the RF link 115. The RDEC transceiver 116 receives the packet 320 that has been transmitted and determines if errors were caused during transmission. In one embodiment, the RDEC transceiver 116 determines errors by computing the CRC over the received block number field 321 and the received block field 322. If the CRC calculated by the RDEC transceiver 116 matches the CRC in the received error control field 323, the RDEC transceiver 116 assumes that the packet 320 has been received without error. If the calculated CRC does not match the CRC in the received error control field 323, the RDEC transceiver 116 assumes that the received packet 320 has not been received error free and the RDEC transceiver 116 discards the entire packet 320. In another embodiment, the error control field 323 contains a systematic forward error correction code so that some transmission errors will not defeat the correct decoding of the received block field 322 of the packet 320.

Figure 5:
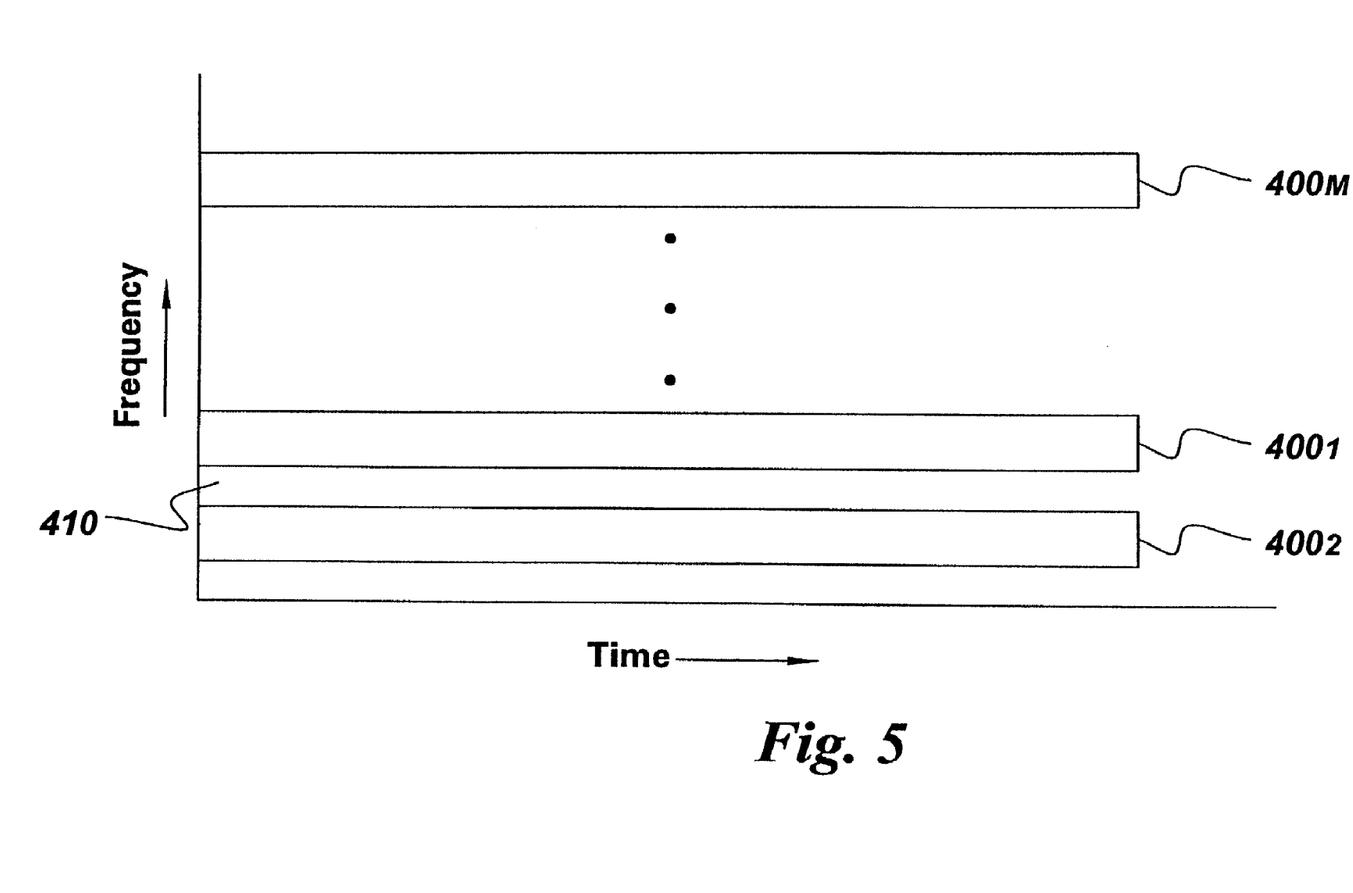
FIG. 5 is a frequency versus time plot of one representative embodiment of the channelization of the RF spectrum.

As shown in FIG. 5, the channelization is shown for available RF bandwidth of the RF link 115 connecting the CDEC 110 and the RDEC 120. In one embodiment, the RF link 115 operates on various frequencies, such as, for example, 900 MHz, 2.4 GHz, 5.7 GHz and 17.2 GHz. In another embodiment, the available RF bandwidth exhibits channelized behavior. In FIG. 5, the RF link 115 comprises M channels $400_1, 400_2, \ldots 400_M$. In one embodiment, the M channels $400_1, 400_2, \ldots 400_M$ are separated by guard bands 410 that comprise frequency spaces between each of the M channels $400_1, 400_2, \ldots 400_M$. In even another embodiment the M channels $400_1, 400_2, \ldots 400_M$ are frequency contiguous and do not have guard bands 410. The spectral width of each of the M channels $400_1, 400_2, \ldots 400_M$ is sufficient to contain the spectral width of the signaling used in transmitting a packet 320. In one embodiment, the M channels $400_1, 400_2, \ldots 400_M$ can be used simultaneously by a predetermined number of CDEC transceivers 112 and/or RDEC transceivers 116 to transmit M number of packets 320. In this embodiment, the time required to transmit a packet 320 on one of the M channels $400_1, 400_2, \ldots 400_M$ is $\tau$ seconds, and it can be assumed that $(R\tau)^{-1} \geq 2$ to allow each of the M channels $400_1, 400_2, \ldots 400_M$ to be used for transmitting two or more packets 320 per message generation time.

In another embodiment, the M channels $400_1, 400_2, \ldots 400_M$ can be used to transmit a subset of the M number of packets 320 on the M channels $400_1, 400_2, \ldots 400_M$. The transmission quality of the M channels $400_1, 400_2, \ldots 400_M$ can be monitored by the CDEC 110 and/or the RDEC 120 during transmission of the subset of packets 320. After the transmission quality of the M channels $400_1, 400_2, \ldots 400_M$ is determined, second subset of the M number of packets 320 is transmitted over the M channels $400_1, 400_2, \ldots 400_M$. The second subset of the M number of packets 320 can consists of packets 320 that have not been transmitted at least once and packets 320 that have been transmitted over one of the M channels $400_1, 400_2, \ldots 400_M$ that had insufficient quality to transport the transmitted packets 320 without error.

Figure 6:
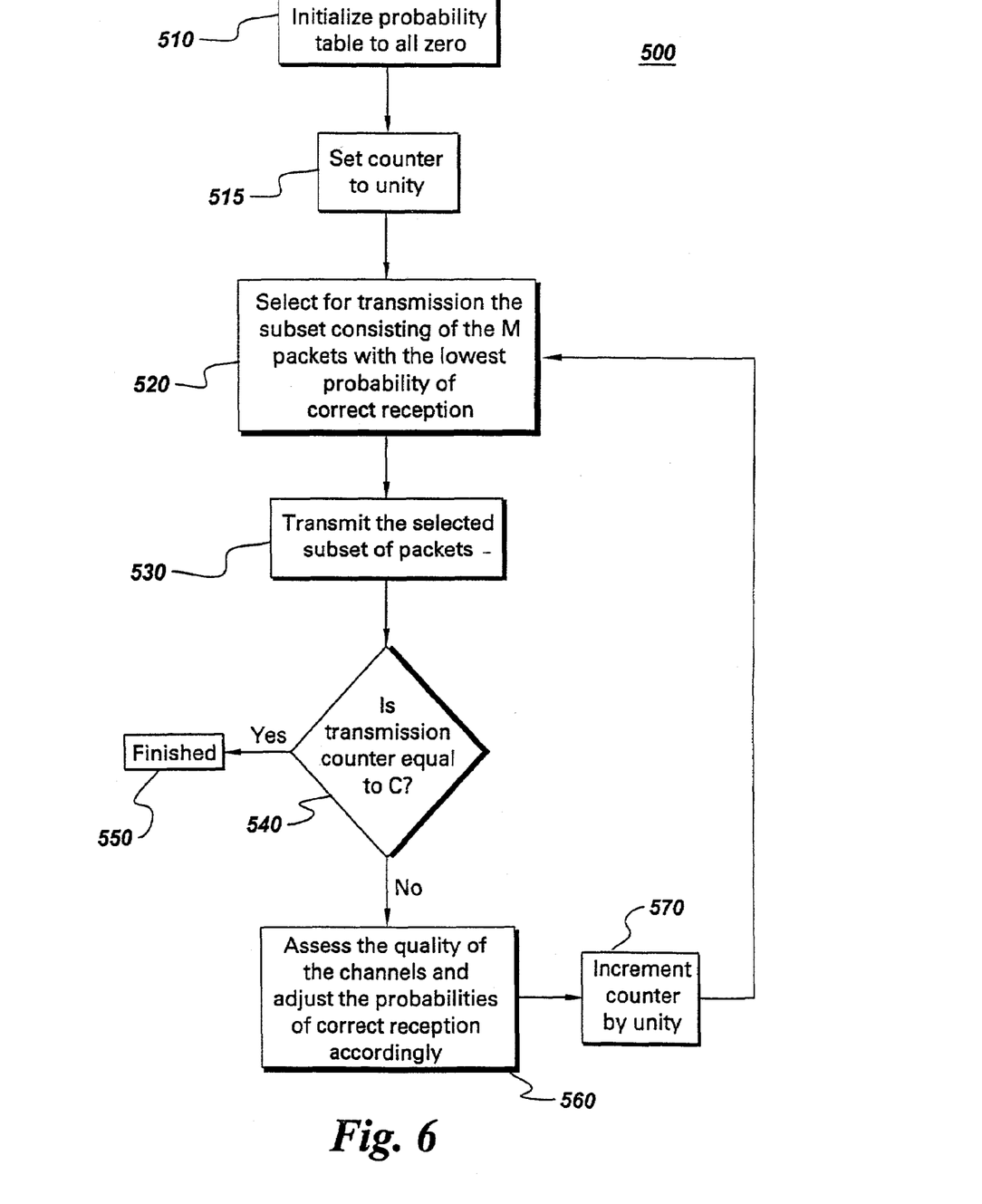
FIG. 6 is a flowchart of one representative embodiment for selecting packets for transmission.

As shown in FIG. 6, one embodiment of a method 500 for transmitting packets 320 over the M channels $400_1, 400_2, \ldots 400_M$ is provided where the number of full packets (C) that can be transmitted per message generation time is $C = \lfloor (R\tau)^{-1} \rfloor$ where $\lfloor x \rfloor$ is a floor function where representing the largest integer less than or equal to x. As shown in FIG. 6, the probability table that associates packet numbers with their respective probabilities of correct reception has its probability entries initialized to zero (step 510). The transmission counter is set to unity (step 515). In one embodiment, N packets 320 are to be transmitted. A subset (M) of the N packets 320 is selected for transmission (step 520). It is assumed that $M \leq N$. The subset M packets 320 that are selected for transmission are those packets 320 that have the lowest probabilities of correct reception. The selected subset M packets 320 are transmitted (step 530). The transmission counter is compared with the number of full packets (C) that can be transmitted per message generation time (step 540). If the transmission counter is equal to C, the method 500 terminates because all of the number of possible whole packets transmission times has been exhausted (step 550). If the transmission counter is not equal to C, the quality of the M channels $400_1, 400_2, \ldots 400_M$ is assessed and the probabilities of correct reception of the subset M transmitted packets is accordingly adjusted (step 560). After the quality of the M channels $400_1, 400_2, \ldots 400_M$ is assessed and the probabilities adjusted, the transmission counter is incremented by unity (step 570), and another subset M packets 320 is selected for transmission (step 520). It should be appreciated that, in one embodiment, the method 500 provided in FIG. 6 can be implemented using an algorithm that is programmed in the CDEC 110 or the RDEC 120. The time interval available for communicating a digital message 300 is $$\frac{1}{R}.$$

At the conclusion of this time interval, the digital message 300 is estimated by concatenating the received N packets 320 in their original order.

Figure 7:
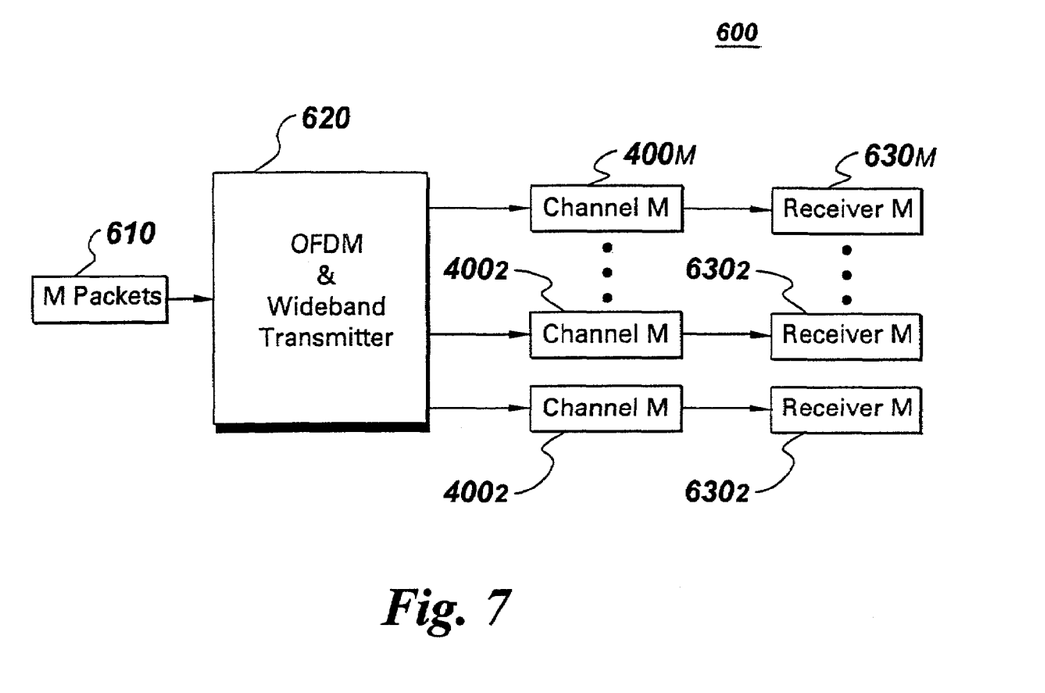
FIG. 7 is a block diagram of a modulator and transmitter for transmitting packets on different channels.

In one embodiment as shown in FIG. 7, a system 600 is used for the simultaneous transmission of 610 M packets 320 on the M channels $400_1$, $400_2$, ... $400_M$. The selected M packets 610 are each modulated onto a respective different one of the M channels $400_1$, $400_2$, ... $400_M$ with one packet per channel using the orthogonal frequency division multiplexing (OFDM) and wideband transmitter unit 620. After modulation, the selected M packets 610 are individually and simultaneously sent on the M channels $400_1$, $400_2$, ... $400_M$ with one packet per channel. The M packets are each individually demodulated by the M receivers $630_1$, $630_2$, ... $630_M$. In one embodiment, the M receivers $630_1$, $630_2$, ... $630_M$ comprise a wideband receiver and OFDM demodulator.

As described hereinabove, during transmission of the M packets 610, each of the M channels $400_1$, $400_2$, ... $400_M$ are monitored for quality. For each of the M channels $400_1$, $400_2$, ... $400_M$ the monitoring is done at or near the OFDM and wideband transmitter unit 620 SO that the OFDM and wide band transmitter unit 620 can assess the probability that an individual one of the M packets 610 was received so that the block field 322 contained in the individual one of the M packets 610 is recoverable without error. The quality of a particular one of the M channels $400_1$, $400_2$, ... $400_M$ is the probability that the one of the M packets 610 that is transmitted over a particular one of the M channels $400_1$, $400_2$, ... $400_M$, after reception and processing, will yield a block field 322 associated with the one of the M packets 610 without error. By virtue of the proximity of the OFDM and wideband transmitter unit 620 to any one of the M receivers $630_1$, $630_2$, ... $630_M$, the OFDM and wideband transmitter unit 620 can effectively estimate the quality of the M channels $400_1$, $400_2$, ... $400_M$. In one embodiment of monitoring the quality, the OFDM and wideband transmitter unit 620 monitors the power of a particular one of the M channels $400_1$, $400_2$, ... $400_M$ during transmission of one of the M packets 610. The power observed from the particular one of the M channels $400_1$, $400_2$, ... $400_M$ is considered to be an approximation of the power, and in one embodiment, the observed power can include noise and interference. In this embodiment, the noise and interference can be assumed to be present in the observed power because the transmission of, for example, one of the M packets 610 on the particular one of the M channels $400_1$, $400_2$, ... $400_M$ is done at an extremely low level in order to comply with various Federal Communications Commission (FCC) regulations and certain host equipment electromagnetic interference limits. In one embodiment, the power level comprises 48 dBμv/m. Therefore, the probability that the particular one of the M packets 610 that is transmitted over the particular one of the M channels $400_1$, $400_2$, ... $400_M$ will provide an errorless transport of the associated block field 322 can be calculated given the known characteristics of the M channels $400_1$, $400_2$, ... $400_M$. In one embodiment, the characteristics of the M channels $400_1$, $400_2$, ... $400_M$ includes, for example, the channel noise including interference, the transmission signaling rate, transmission signaling power, and signaling modulation. In one embodiment, the probability that the transmission of any one of the M packets 610 will be errorless is $f(\epsilon_b/N_o)$ which is a function of energy per bit ($\epsilon_b$) of the transmitted one of the M packets 610 divided by the noise spectral density ($N_o$) of the particular one of the M channels $400_1$, $400_2$, ... $400_M$.

Figure 8:
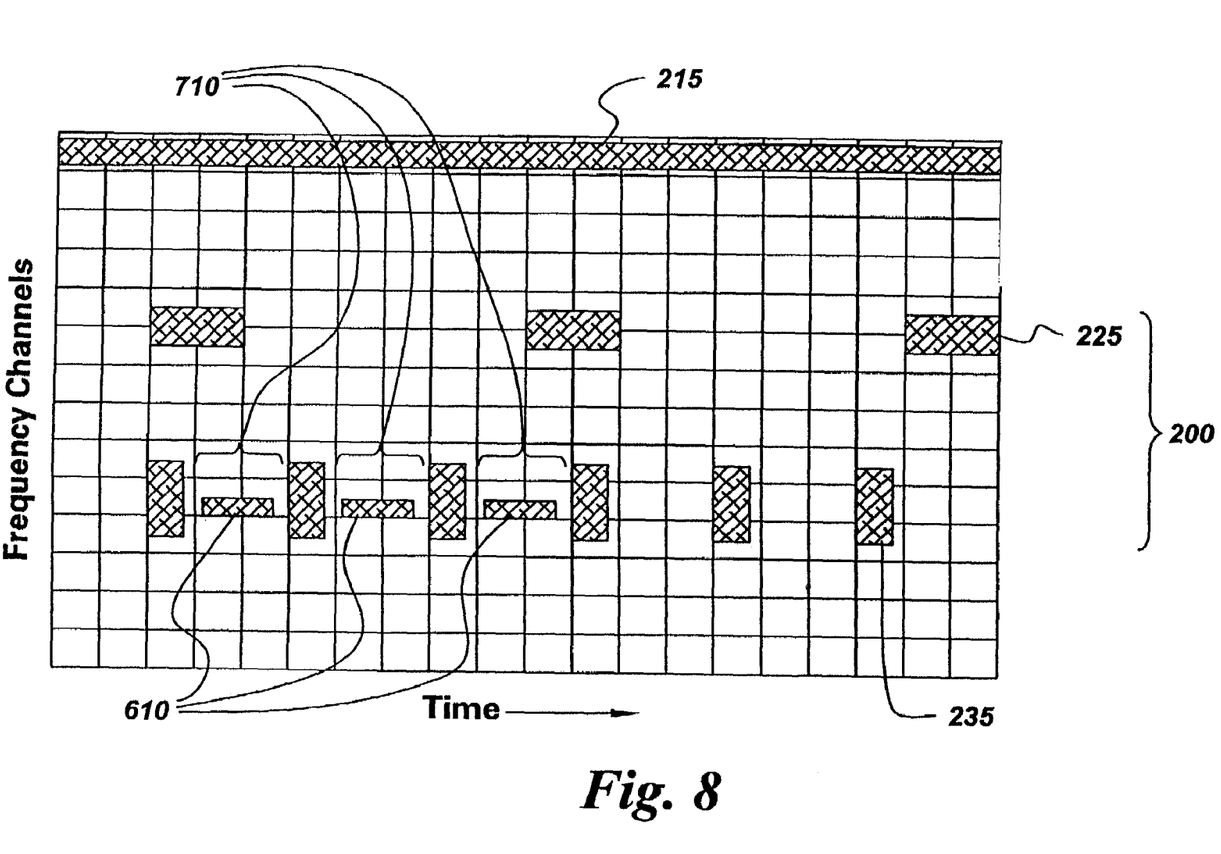
FIG. 8 is a frequency channel versus time diagram showing packets transmitted interstitially between pulse jamming signals.

In one embodiment where at least one of the M channels $400_1$, $400_2$, ... $400_M$ is subject to radar interference 200, such as square wave jammers/interferers 220 or pulse jammers/interferers 230 in FIG. 2, the M packets 610 are transmitted as described hereinabove on any of the M channels $400_1$, $400_2$, ... $400_M$ that are not affected by the radar interference 200. As shown in FIG. 8, on any of the M channels $400_1$, $400_2$, ... $400_M$ that experience radar interference 200, the M packets 610 are transmitted in the interstices 710 of the jamming radar interference 200 on the ones of the M channels $400_1$, $400_2$, ... $400_M$ that are subject to periodic jamming. In FIG. 8, the packets 710 are interspersed between jamming pulses 235 associated with a pulse type jammer 230 (FIG. 2).

Figure 9:
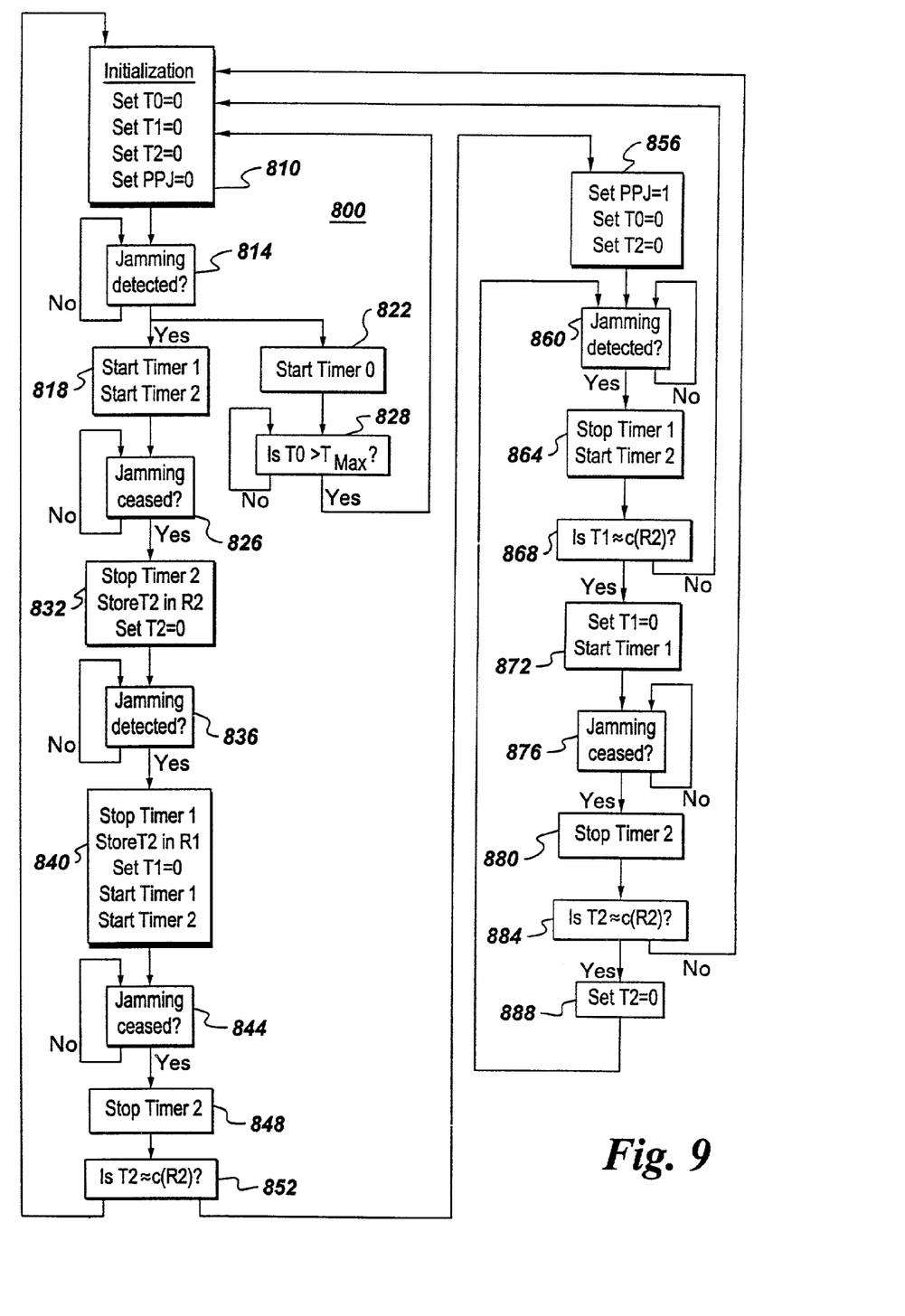
FIG. 9 is a flowchart of one representative embodiment for estimating parameters of a jamming process.

In one embodiment, at least one of the M channels $400_1$, $400_2$, ... $400_M$ can be diagnosed to determine if it is being periodically jammed by, for example, jamming pulses 235. In this embodiment as shown in FIG. 9, one goal of the method 800 is to produce three estimators for use in inserting the M packets 610 in the interstices 710 of the jamming radar interference 200. In one embodiment, the three estimators are a presence of pulse jamming (PPJ) binary flag, quantity R1 and quantity R2. The PPJ binary flag is set to 0 if jamming pulses 235 are not detected, and the binary flag is set to 1 if jamming pulses 235 are detected. The quantity R1 is an approximation of the inverse of the pulse jamming repetition time. The quantity R2 is an approximation of the jamming pulse duration.

As shown in FIG. 9 in one embodiment of the method 800, three timers T0, T1 and T2 are initialized to zero and the PPJ binary flag is also initialized to zero (step 810). After the values are initialized, the particular one of the M channels $400_1$, $400_2$, ... $400_M$ is monitored to determine if jamming pulses 235 are present (step 814). In one embodiment, the presence of jamming pulses 235 is determined by detecting the presence of noise on the particular one of the M channels $400_1$, $400_2$, ... $400_M$ that exceeds a specified predetermined threshold. In one embodiment, the specified predetermined threshold can be selected based on the probability that a bit signaled during the jamming period would be decoded incorrectly with some significant probability. When jamming pulses 235 are detected (step 814), timer T0 is started (step 822). The contents of timer T0 is constantly compared to a limit TMAX that is an upper limit that has been predetermined (step 828). The timer T0 is driven by a clock that has a rate that has been predetermined. The comparison of the contents of timer T0 with TMAX (step 828) is made independently of any other step in the method 800. Once the contents of timer T0 is equal to TMAX, the method 800 returns to initialization (step 810). The timer T0 servers a time-out constraint in order to reset the method 800 if the detected jamming (step 814) was an errant pulse burst unrelated to periodic jamming pulses 235 or if the characteristics of observed jamming have changed.

In addition when jamming pulses 235 are detected (step 814), timer 1 and timer 2 are started (step 818). After timer 1 and timer 2 have been started (step 818), the particular one of the M channels $400_1$, $400_2$, ... $400_M$ is monitored to determine the cessation of the jamming pulses 235 (step 826). In one embodiment, the cessation of the jamming pulses 235 is determined when the signal power is less than a predetermined value. When it is determined that the jamming has ceased (step 826), timer 2 is stopped, and after the contents of timer 2 (T2) is stored in storage register R2, timer 2 is set to zero (step 832). The contents of timer 2 (T2) is an estimate of the jamming pulse duration. Again, the particular one of the M channels $400_1$, $400_2$, ... $400_M$ is monitored to determine the presence of jamming pulses 235 (step 836). When jamming pulses 235 are detected (step 836), timer 1 is stopped and the contents of timer 1 (T1) is stored at storage register R1, and the timer 1 is set to zero (step 840). The contents of timer 1 (T1) is an estimate of the inverse of the pulse jamming repetition time. In addition, the timer 1 and timer 2 are started (step 840). Again, the particular one of the M channels $400_1$, $400_2$, ... $400_M$ is monitored to determine the cessation of the jamming pulses 235 (step 844). In one embodiment, the cessation of the jamming pulses 235 is determined when the signal power is less than a predetermined value. When the jamming pulses 235 have stopped (step 844), timer 2 is stopped (848). The contents of timer 2 (T2) is compared to the contents of storage register R2 (denoted by c(R2)) (step 852). If the contents of timer 2 (T2) is not equal to about the contents of storage register R2 (c(R2)) (step 852), then the method 800 is again initialized (step 810). In one embodiment, the contents of timer 2 (T2) is about equal to the contents of storage register R2 (c(R2)) when a difference between the two quantities is within a predetermined percentage. In another embodiment, a system specifier determines the predetermined percentage. If the contents of timer T2 is equal to about the contents of storage register c(R2) (step 852), periodic pulse jamming is present and the periodic pulse jamming (PPJ) flag is set to 1 (high), and timer 0 and timer 2 are set to zero (step 856).

Again, the particular one of the M channels $400_1$, $400_2$, ... $400_M$ is monitored to determine the presence of jamming pulses 235 (step 860). If jamming pulses 235 are detected (step 860), timer 1 is stopped and timer 2 is started (step 864). The contents of timer 1 (T1) is compared to the contents of storage register R1 (denoted by c(R1)) (step 868). If the contents of timer 1 (T1) is not equal to about the contents of storage register R1 (c(R1)), the method 800 is again initialized (step 810). When the contents of timer 1 (T1) is equal to about the contents of storage register R1 c(R1) (step 868), timer 1 is set to 0 and again started (step 872). In one embodiment, the contents of timer 1 (T1) is about equal to the contents of storage register R1 (c(R1)) when a difference between the two quantities is within a predetermined percentage. In another embodiment, a system specifier determines the predetermined percentage. Again, the particular one of the M channels $400_1$, $400_2$, ... $400_M$ is monitored to determine the cessation of the jamming pulses 235 (step 876). In one embodiment, the cessation of the jamming pulses 235 is determined when the signal power is less than a predetermined value. When the jamming pulses 235 have stopped (step 876), timer 2 is stopped (880). The contents of timer 2 (T2) is compared with the contents of storage register R2 (denoted by c(R2)) (step 884). If the contents of timer 2 (T2) is not equal to about the contents of storage register R2 (c(R2)), the method 800 is again initialized (step 810). When the contents of timer 2 (T2) is equal to about the contents of storage register R2 c(R2) (step 884), timer 2 is set to 0 (step 888). After timer 2 is set to 0 (step 888), the method 800 is returned to step 856 to determine characteristics of periodic pulse jamming (PPJ). In one embodiment, the contents of timer 1 (T1) is about equal to the contents of storage register R1 (c(R1)) when a difference between the two quantities is within a predetermined percentage. In another embodiment, a system specifier determines the predetermined percentage. It should be appreciate, as shown in FIG. 9, that once a determination has been made that periodic pulse jamming (PPJ) is present, steps 860, 864, 868, 872, 876, 880, 884 and 888 are used to determine if the characteristics of the detected periodic pulse jamming (PPJ) interference changes.

If periodic pulse jamming is detected, the periodic pulse jamming (PPJ) flag will be set to 1 (high). The M packets 610 can be scheduled for transmission on a particular one of the M channels $400_1$, $400_2$, ... $400_M$ by transmitting the M packets 610 in the interstices 710 between the jamming pulses 235 as shown in FIG. 8. To transmit the M packets 610 in the interstices 710 between the jamming pulses 235, the contents of storage register R1 (c(R1)) and the contents of storage register R2 (cR2)) can be used. The contents of storage register R1 (c(R1)) comprises the inverse of the pulse jamming repetition time, and the contents of storage register R2 (c(R2)) comprises the jamming pulse duration.

Figure 10:
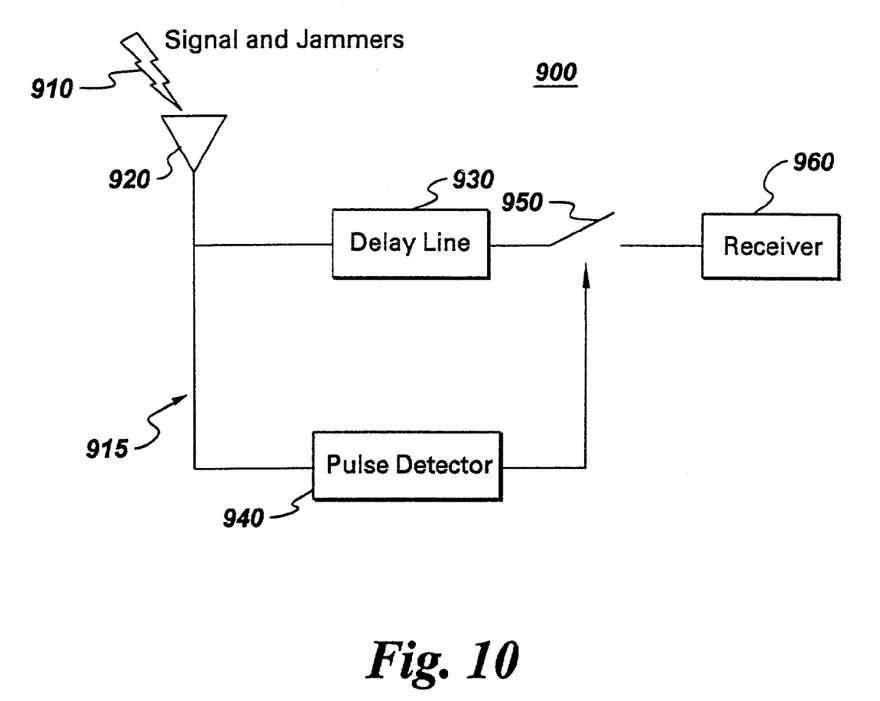
FIG. 10 is a block diagram of one representative embodiment of a pulse shield for protecting a receiver front end against desensitization.

Jamming pulses 235 can desensitize any one of the M receivers $630_1$, $630_2$, ... $630_M$ for a duration significantly exceeding the pulse jamming signal duration. In one embodiment, as shown in FIG. 10, the front end of the M receivers $630_1$, $630_2$, ... $630_M$ includes a pulse shield 900 to prevent desensitization of the M receivers $630_1$, $630_2$, ... $630_M$. In an electromagnetic environment comprising signals and jammers 910 that are received by antenna 920, the RF portion of the front end 915 is divided into two paths including a delay line 930 and a pulse detector 940. The pulse detector 940 comprises circuitry for detecting pulse interference, such as, for example, jamming pulses 235. In one embodiment, the pulse detector 940 comprises a radiometer or power threshold device. When the pulse detector 940 detects a jamming pulse 235, a blanking switch 950 is opened. Therefore, since the delay line 930 delays the incoming signal and jammers 910, the opening of the blanking switch 950 prevents the receiver 960 from receiving the jamming pulse 235 that might otherwise desensitize the receiver 960.

The foregoing discussion of the invention has been presented for purposes of illustration and description. Further, the description is not intended to limit the invention to the form disclosed herein. Consequently, variations and modifications commensurate with the above teachings and with the skill and knowledge of the relevant art are within the scope of the present invention. The embodiment described herein above is further intended to explain the best mode presently known of practicing the invention and to enable others skilled in the art to utilize the invention as such, or in other embodiments, and with the various modifications required by their particular application or uses of the invention. It is intended that the appended claims be construed to include alternative embodiments to the extent permitted by the prior art.

What is claimed is:

1. A method for communicating a message over a radio frequency (RF) communications network having a plurality of RF channels, the method comprising the steps of:

partitioning the message into a plurality of blocks having a predetermined order;

converting the plurality of blocks into a plurality of packets;

selecting a subset of the plurality of packets;

transmitting the selected subset of the plurality of packets over at least one of the plurality of RF channels of the RF communications network;

receiving the selected subset of the plurality of packets transmitted over the at least one of the plurality of RF channels;

estimating a quality of the at least one of the plurality of RF channels from at least the received selected subset of the plurality of packets; and constructing an estimate of the message using at least the received selected subset of the plurality of packets and the estimated quality of the at least one of the plurality of RF channels;

wherein the step of transmitting further comprises the steps of:
  detecting a presence of jamming pulses in at least one of the plurality of RF channels;
  determining characteristics of the jamming pulses in the at least one of the plurality of RF channels wherein the determined characteristics define at least interstices between the jamming pulses; and
  transmitting the selected subset of the plurality of packets over the at least one of the plurality of RF channels wherein the selected subset of the plurality of packets is transmitted within the interstices of the jamming pulse determined from the step of determining characteristics of the jamming pulses.

2. The method of claim 1 wherein each of the plurality of packets comprises at least a block number field, a block field and an error control field.

3. The method of claim 2 wherein the error control field comprises a cyclic redundancy code.

4. The method of claim 2 wherein the error control field comprises forward error correction coding information.

5. The method of claim 1 wherein the step of selecting the subset of the plurality of packets comprises selecting the subset of the plurality of packets having a predetermined probability of error-free reception.

6. The method of claim 1 wherein the step of transmitting the selected subset of the plurality of packets uses orthogonal frequency division multiplexing (OFDM) communication techniques.

7. The method of claim 1 wherein the step of transmitting the selected subset of the plurality of packets transmits the selected subset of the plurality of packets using communication techniques selected from the groups consisting of Bluetooth communications techniques and IEEE standard 802.11 communications techniques.

8. The method of claim 1 wherein the characteristics comprise at least jamming pulse duration and jamming pulse repetition time.

9. The method of claim 1 wherein the method further comprises processing the received selected subset of the plurality of packets to yield the plurality of blocks of the message.

10. The method of claim 9 wherein the step of constructing an estimate of the message comprises the step of ordering the plurality of blocks of the message to yield the plurality of blocks having the predetermined order.

11. The method of claim 1 wherein the step of transmitting the selected subset of the plurality of packets uses Bluetooth communications techniques.

12. The method of claim 1 wherein the step of transmitting the selected subset of the plurality of packets uses IEEE standard 802.11 communication techniques.

13. A method transmitting a message over at least one of a plurality of radio frequency (RF) channels of an RF communications network, the method comprising the steps of:
  detecting a presence of jamming pulses in the at least one of the plurality of RF channels;
  determining characteristics of the jamming pulses in the at least one of the plurality of RF channels wherein the determined characteristics define at least interstices between the jamming pulses; and
  transmitting the message over the at least one of the plurality of RF channels wherein the message is transmitted within the interstices of the jamming pulse determined from the step of determining characteristics of the jamming pulses.

14. The method of claim 13 further comprises the steps of:
  partitioning the message into a plurality of blocks having a predetermined order;
  converting the plurality of blocks into a plurality of packets;
  selecting a subset of the plurality of packets; and
  wherein the step of transmitting further comprises transmitting the selected subset of the plurality of packets over the at least one of the plurality of RF channels.

15. The method of claim 14 wherein the step of selecting the subset of the plurality of packets comprises selecting the subset of the plurality of packets having a predetermined probability of error-free reception.

16. The method of claim 14 further comprising the steps of:
  receiving the selected subset of the plurality of packets transmitted over the at least one of the plurality of RF channels;
  estimating a quality of the at least one of the plurality of RF channels from at least received selected subset of the plurality of packets; and
  constructing an estimate of the message using at least the received selected subset of the plurality of packets and the estimated quality of the at least one of the plurality of RF channels.

17. The method of claim 16 wherein the method further comprises processing the received selected subset of the plurality of packets to yield the plurality of blocks of the message.

18. The method of claim 17 wherein the step of constructing an estimate of the message comprises the step of ordering the plurality of blocks of the message to yield the plurality of blocks having the predetermined order.

19. The method of claim 13 wherein the characteristics comprise at least jamming pulse duration and jamming pulse repetition time.

20. The method of claim 13 wherein the step of transmitting the selected subset of the plurality of packets uses Bluetooth communications techniques.

21. The method of claim 13 wherein the step of transmitting the selected subset of the plurality of packets uses IEEE standard 802.11 communication techniques.

* * * * *